US010532461B2

(12) United States Patent
Kobayashi et al.

(10) Patent No.: US 10,532,461 B2
(45) Date of Patent: Jan. 14, 2020

(54) ROBOT AND ROBOT SYSTEM

(71) Applicant: Seiko Epson Corporation, Tokyo (JP)

(72) Inventors: Masakazu Kobayashi, Shiojiri (JP); Yudai Takeuchi, Suwa (JP)

(73) Assignee: Seiko Epson Corporation (JP)

(*) Notice: Subject to any disclaimer, the term of this patent is extended or adjusted under 35 U.S.C. 154(b) by 172 days.

(21) Appl. No.: 15/494,899

(22) Filed: Apr. 24, 2017

(65) Prior Publication Data

US 2017/0312921 A1    Nov. 2, 2017

(30) Foreign Application Priority Data

Apr. 28, 2016    (JP) ................................. 2016-090391

(51) Int. Cl.
*B25J 9/16* (2006.01)

(52) U.S. Cl.
CPC .......... *B25J 9/1633* (2013.01); *B25J 9/1687* (2013.01); *G05B 2219/40032* (2013.01); *Y10S 901/45* (2013.01)

(58) Field of Classification Search
USPC ................................................. 700/245–264
See application file for complete search history.

(56) References Cited

U.S. PATENT DOCUMENTS

| | | | | |
|---|---|---|---|---|
| 4,146,924 A | * | 3/1979 | Birk | B25J 9/1692 318/568.13 |
| 4,731,856 A | * | 3/1988 | Lloyd | B23P 19/10 348/94 |
| 4,869,813 A | * | 9/1989 | Bailey | B07C 5/3422 209/538 |
| 5,308,221 A | * | 5/1994 | Shimokoshi | B25J 9/1612 414/730 |
| 5,761,390 A | * | 6/1998 | Koshishiba | B25J 9/1679 700/250 |
| 6,141,863 A | * | 11/2000 | Hara | B25J 9/1633 29/714 |
| 6,681,151 B1 | * | 1/2004 | Weinzimmer | B25J 9/1697 219/121.85 |
| 7,084,900 B1 | * | 8/2006 | Watanabe | G06K 9/6203 348/94 |
| 7,177,459 B1 | * | 2/2007 | Watanabe | B25J 9/1697 382/151 |
| 8,644,986 B2 | * | 2/2014 | Tsuboi | G05B 13/021 414/1 |
| 8,942,845 B2 | * | 1/2015 | Yamaguchi | B25J 15/0206 700/245 |
| 9,138,893 B2 | | 9/2015 | Nagai et al. | |
| 9,149,928 B2 | * | 10/2015 | Yamaguchi | B25J 9/043 |
| 9,352,463 B2 | * | 5/2016 | Tomo | B25J 15/0616 |
| 9,486,927 B1 | * | 11/2016 | Morey | B25J 15/10 |
| 2005/0126833 A1 | * | 6/2005 | Takenaka | B25J 13/088 180/8.1 |

(Continued)

FOREIGN PATENT DOCUMENTS

JP    2014-166681 A    9/2014

*Primary Examiner* — Jonathan L Sample
(74) *Attorney, Agent, or Firm* — Harness, Dickey & Pierce, P.L.C.

(57) ABSTRACT

A robot includes an arm, and a force detector that is disposed on the arm and detects a force, in which a first object is held from both of a gravity direction and a direction opposite to the gravity direction, and the first object is inserted into an insertion portion provided in a second object.

7 Claims, 10 Drawing Sheets

(56) References Cited

U.S. PATENT DOCUMENTS

| | | | | |
|---|---|---|---|---|
| 2006/0104788 A1* | 5/2006 | Ban | B25J 9/1697 | 414/729 |
| 2006/0241814 A1* | 10/2006 | Jung | G05D 1/0225 | 700/259 |
| 2007/0276539 A1* | 11/2007 | Habibi | B25J 9/1612 | 700/245 |
| 2008/0181485 A1* | 7/2008 | Beis | B25J 9/1697 | 382/153 |
| 2008/0249659 A1* | 10/2008 | Ueyama | B25J 9/0018 | 700/245 |
| 2008/0252248 A1* | 10/2008 | Lundberg | B25J 9/1692 | 318/572 |
| 2008/0267450 A1* | 10/2008 | Sugimoto | A63H 17/395 | 382/103 |
| 2009/0096790 A1* | 4/2009 | Wiedemann | G06K 9/00201 | 345/427 |
| 2010/0087955 A1* | 4/2010 | Tsusaka | B25J 9/0003 | 700/245 |
| 2011/0010009 A1* | 1/2011 | Saito | B25J 9/1612 | 700/253 |
| 2012/0048027 A1* | 3/2012 | Hashiguchi | B25J 9/0087 | 73/763 |
| 2012/0191245 A1* | 7/2012 | Fudaba | B25J 3/04 | 700/254 |
| 2012/0197438 A1* | 8/2012 | Ogami | B25J 9/1682 | 700/258 |
| 2012/0290133 A1* | 11/2012 | Goto | B25J 9/1612 | 700/258 |
| 2012/0296472 A1* | 11/2012 | Nagai | B25J 9/1612 | 700/258 |
| 2013/0030570 A1* | 1/2013 | Shimizu | B25J 9/1679 | 700/259 |
| 2013/0184869 A1* | 7/2013 | Inazumi | B25J 9/1633 | 700/260 |
| 2013/0184871 A1* | 7/2013 | Fudaba | B25J 13/02 | 700/264 |
| 2013/0197696 A1* | 8/2013 | Nammoto | B25J 9/1612 | 700/259 |
| 2013/0238128 A1* | 9/2013 | Suzuki | B25J 9/1669 | 700/258 |
| 2013/0271577 A1* | 10/2013 | Watanabe | H04N 13/275 | 348/46 |
| 2013/0345870 A1* | 12/2013 | Buehler | B25J 9/0087 | 700/257 |
| 2014/0036276 A1* | 2/2014 | Gross | G01N 35/00732 | 356/614 |
| 2014/0074288 A1* | 3/2014 | Satou | B25J 9/1679 | 700/253 |
| 2014/0324218 A1* | 10/2014 | Suzuki | B25J 9/1612 | 700/258 |
| 2015/0127153 A1* | 5/2015 | Yamaguchi | B25J 9/1692 | 700/254 |
| 2015/0127158 A1* | 5/2015 | Shimodaira | G05B 19/401 | 700/258 |
| 2015/0127160 A1* | 5/2015 | Yamaguchi | B25J 9/1697 | 700/259 |
| 2015/0251314 A1* | 9/2015 | Nammoto | B25J 9/1612 | 700/259 |
| 2015/0298321 A1* | 10/2015 | Gross | B65G 11/023 | 422/67 |
| 2016/0059407 A1* | 3/2016 | Sonoda | B25J 9/0081 | 700/260 |
| 2016/0075031 A1* | 3/2016 | Gotou | B25J 9/1697 | 700/259 |

* cited by examiner

| SPECIFI-CATIONS | MALE SIDE TOP VIEW | MALE SIDE FRONT VIEW | FEMALE SIDE FRONT VIEW | REQUIRED INSERTION PRESSURE [N] | GRIPPING PRESSURE [N] |
|---|---|---|---|---|---|
| USB-A TYPE | | | | 10-15 | 10.3 |
| HDMI | | | | 40-45 | 14 |

FIG. 4

ROBOT AND ROBOT SYSTEM

BACKGROUND

1. Technical Field

The present invention relates to a robot and a robot system.

2. Related Art

Research and development for a robot that fits together two objects are performed.

In this regard, there is known a robot that performs an fitting work which is a predetermined work for fitting a first workpiece into a second workpiece, by three operations of a contact operation for coming the first workpiece into contact with the second workpiece, a search operation for searching a shape of the second workpiece in the first workpiece, and an insertion operation for inserting the first workpiece into the second workpiece (refer to JP-A-2014-166681).

However, in such a robot, since the shape of the second workpiece is inspected by moving the first workpiece while maintaining the first workpiece in contact with the second workpiece, any one or both of the first workpiece and the second workpiece may be deformed in some cases. In addition, in the robot, since the first workpiece is gripped while holding the first workpiece from the direction orthogonal to a gravity direction by a hand, a relative positional relationship between the first workpiece and the hand shifts due to a weight of the first workpiece or the like in some cases. As a result, in the robot, the time to perform the inspection operation described above may be longer, and it is difficult to shorten the time to perform a predetermined work in some cases.

SUMMARY

An aspect of the invention is directed to a robot including: an arm; and a force detector that is disposed on the arm and detects a force, in which a first object is held from both of a gravity direction and a direction opposite to the gravity direction, and the first object is inserted into an insertion portion provided in a second object.

According to this configuration, the robot holds the first object from the gravity direction and the direction opposite to the gravity direction, and inserts the first object into the insertion portion provided in the second object. In this manner, the robot can suppress a shifting of a relative positional relationship between a portion holding the first object among the portions of the robot and the first object in the gravity direction.

In another aspect of the invention, the robot may be configured such that the first object is gripped in a state where the first object is regulated in a direction orthogonal to the gravity direction.

According to this configuration, the robot grips the first object in a state where the first object is regulated in a direction orthogonal to the gravity direction. In this manner, the robot can suppress a shifting of a relative positional relationship between a portion holding the first object among the portions of the robot and the first object in the gravity direction, and can suppress the shifting of the positional relationship in the direction orthogonal to the gravity direction.

In another aspect of the invention, the robot may be configured such that at least one of the first object and the second object is moved by the arm in a direction where the first object and the second object approach each other, and thus in a case where it is determined that the first object comes into contact with a position different from the insertion portion based on an output of the force detector, the first object and the second object are separated from each other.

According to this configuration, the robot causes the arm to move at least one of the first object and the second object in a direction where the first object and the second object approach each other, and thus in a case where it is determined that the first object comes into contact with a position different from the insertion portion based on an output of the force detector, separates the first object and the second object from each other. In this manner, the robot can prevent the first object and the second object from being deformed in a case where the first object comes into contact with the position different from the insertion portion provided in the second object.

In another aspect of the invention, the robot may be configured such that in a case where it is determined that the first object comes into contact with the position, at least one of the first object and the second object is moved in a direction that is other than the direction opposite to the approaching direction, and is a direction orthogonal to the gravity direction among the directions where the first object and the second object separate from each other, and thus the first object and the second object are separated from each other.

According to this configuration, in a case where it is determined that the first object comes into contact with the position different from the insertion portion provided in the second object, the robot moves at least one of the first object and the second object in a direction that is other than the direction opposite to the direction where the first object and the second object approach each other, and is a direction orthogonal to the gravity direction among the directions where the first object and the second object separate from each other, and thus separates the first object and the second object from each other. In this manner, the robot can start moving at least one of the first object and the second object in the direction from the position that is the previous position, and is different from the position where the first object and the second object start moving in the approaching direction.

In another aspect of the invention, the robot may be configured such that an operation that separates the first object and the second object from each other is performed by position control.

According to this configuration, the robot performs the operation that separates the first object and the second object by the position control. In this manner, the robot can shorten the time for inserting the first object into the insertion portion of the second object.

In another aspect of the invention, the robot may be configured such that the first object is an electronic component.

According to this configuration, the robot holds the electronic component from the gravity direction and the direction opposite to the gravity direction and inserts the electronic component into the insertion portion provided in the second object. In this manner, the robot can suppress the shifting of the relative positional relationship between the electronic component and the portion holding the electronic component among the portions of the robot in the gravity direction.

Another aspect of the invention is directed to a robot system including: the robot described above; and a robot control device that controls the robot.

According to this configuration, the robot system holds a first object from a gravity direction and a direction opposite to the gravity direction, and inserts the first object into an insertion portion provided in a second object. In this manner, the robot system can suppress a shifting of a relative positional relationship between a portion holding the first object among the portions of the robot and the first object in the gravity direction.

With the configurations described above, the robot and the robot system holds the first object from the gravity direction and the direction opposite to the gravity direction, and inserts the first object into the insertion portion provided in the second object. In this manner, the robot and the robot system can suppress the shifting of the relative positional relationship between the portion holding the first object among the portions of the robot and the first object in the gravity direction.

BRIEF DESCRIPTION OF THE DRAWINGS

The invention will be described with reference to the accompanying drawings, wherein like numbers reference like elements.

FIG. 4 is a diagram illustrating a specific example of specifications of the connector and the connector.

DESCRIPTION OF EXEMPLARY EMBODIMENTS

Embodiment

Hereinafter, embodiments of the invention will be described with reference to drawings.

Configuration of Robot System

First, a configuration of a robot system 1 will be described.

Figure 1:
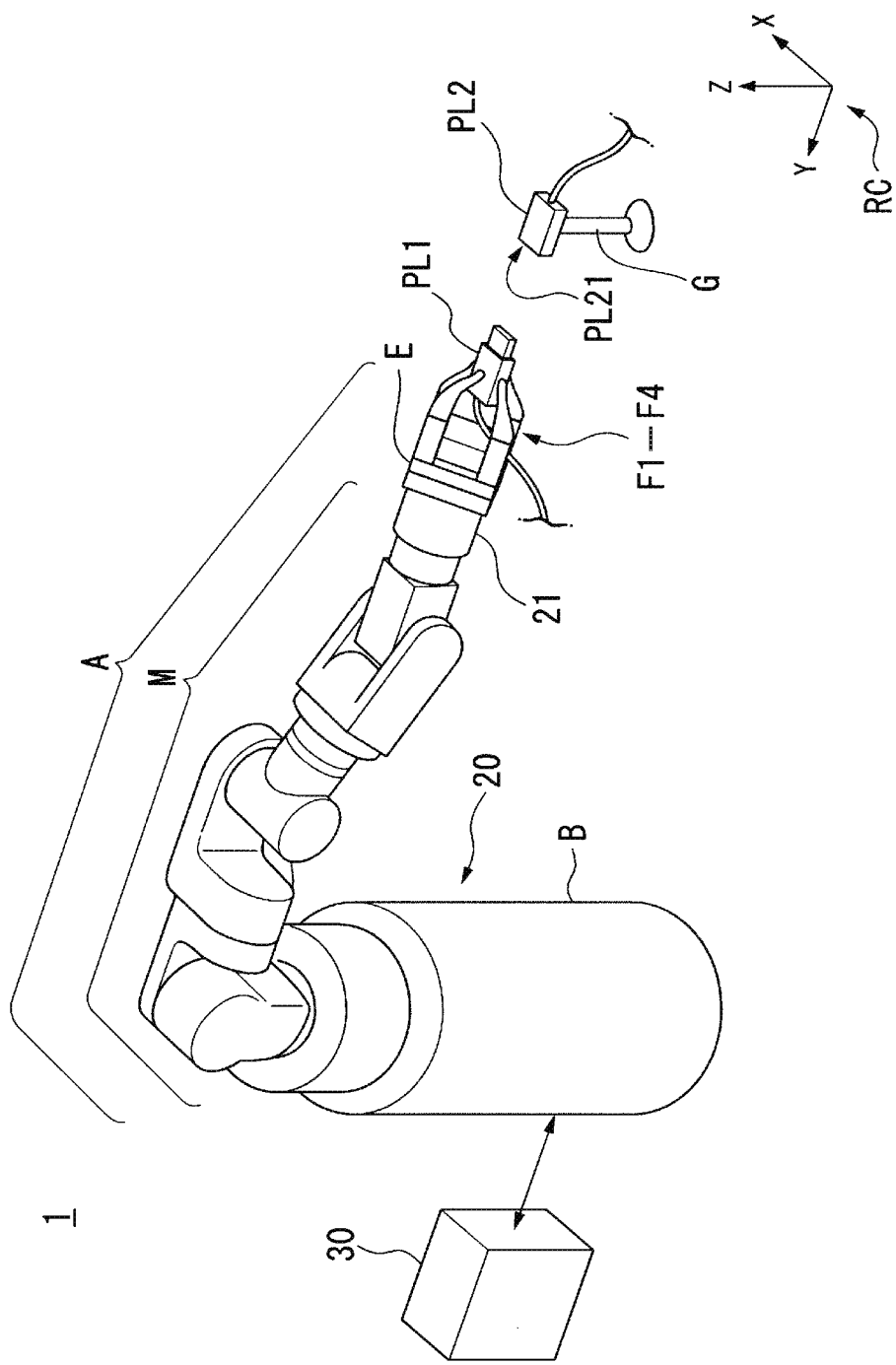
FIG. 1 is a diagram illustrating an example of a configuration of a robot system according to an embodiment.

FIG. 1 is a diagram illustrating an example of a configuration of a robot system 1 according to an embodiment. The robot system 1 is provided with a robot 20 and a robot control device 30.

The robot 20 is a single arm robot provided with an arm A and a support base B for supporting the arm A. The single arm robot is a robot provided with one arm such as the arm A in this example. The robot 20 may be a multi arm robot, instead of the single arm robot. The multi arm robot is a robot provided with two or more arms (for example, two or more arms A). Among the multi arm robots, a robot provided with two arms is referred to as a double arm robot. That is, the robot 20 may be the double arm robot provided with two arms, and may be the multi arm robot provided with three or more arms (for example, three or more arms A). In addition, the robot 20 may be another robot such as a SCARA robot or a cartesian coordinate robot. The cartesian coordinate robot is, for example, a gantry robot.

The arm A is provided with an end effector E, a manipulator M, and a force detection unit 21.

In this example, the end effector E is the end effector provided with a finger portion capable of gripping an object. The finger portion is provided with two or more fingers. Hereinafter, as an example, a case where the finger portion is provided with fingers F1 to F4 which are four fingers will be described. The end effector E grips the object by holding the object by each of the fingers F1 to F4. The end effector E may be another end effector capable of lifting an object with a magnet, a jig, or the like, instead of the end effector provided with the finger portion.

The finger portion provided in the end effector E is communicably connected to the robot control device 30 by a cable. In this manner, the finger portion operates each of the fingers F1 to F4 based on a control signal acquired from the robot control device 30. Wired communication via a cable is performed according to standards such as Ethernet (registered trademark) and a universal serial bus (USB), for example. In addition, the finger portion may be configured to be connected to the robot control device 30 by wireless communication performed according to a communication standard such as Wi-Fi (registered trademark).

The manipulator M has seven joints. In addition, each of the seven joints is provided with an actuator (not illustrated). That is, the arm A provided with the manipulator M is a seven-axis vertical multi-joint arm. The arm A performs an operation with degree of freedom of seven axes by a cooperative operation with the support base B, the end effector E, the manipulator M, and the actuators of each of the seven joints provided in the manipulator M. The arm A may be configured to operate with degrees of freedom of six axes or less, or may be configured to operate with degrees of freedom of eight axes or more.

In a case where the arm A operates with degrees of freedom of seven axes, the possible posture of the arm A increases, as compared with a case where the arm A operates with degrees of freedom of six axes or less. In this manner, for example, the operation of the arm A becomes smooth, and the arm A can further easily avoid interference with an object existing around the arm A. In addition, in a case where the arm A operates with degrees of freedom of seven axes, the control of the arm A is easy with a small amount of calculation, as compared with a case where the arm A operates with degrees of freedom of eight axes or more.

Each of the seven actuators provided in the manipulator M (provided in the joints) is communicably connected to the robot control device 30 by the cable. In this manner, the actuator operates the manipulator M based on the control signal acquired from the robot control device 30. The wired communication via the cable is performed according to standards such as Ethernet (registered trademark) and USB, for example. In addition, a part or all of the seven actuators provided in the manipulator M may be configured to be connected to the robot control device 30 by the wireless communication performed according to the communication standard such as Wi-Fi (registered trademark).

The force detection unit 21 is provided between the end effector E and the manipulator M. The force detection unit 21 is, for example, a force sensor. The force detection unit 21 detects the end effector E or forces and moments (torques) acting on the object gripped by the end effector E. The force detection unit 21 outputs force detection information including a value indicating the magnitude of the detected force and moment as an output value to the robot control device 30 by communication. The force detection unit 21 is an example of a force detector.

The force detection information is used for control based on the force detection information among the controls of the arm A by the robot control device 30. The control based on the force detection information is, for example, compliant motion control such as impedance control. The force detection unit 21 may be another sensor that detects a value indicating a magnitude of a force or a moment applied to an end effector E such as a torque sensor or an object gripped by the end effector E.

The force detection unit 21 is communicably connected to the robot control device 30 by the cable. The wired communication via the cable is performed according to standards such as Ethernet (registered trademark) and USB, for example. The force detection unit 21 and the robot control device 30 may be configured to be connected by the wireless communication performed according to the communication standard such as Wi-Fi (registered trademark).

In addition to functional units described above, the robot 20 may have one or more imaging units. Hereinafter, as an example, the case where the robot 20 does not have an imaging unit will be described.

In this example, the robot control device 30 is a robot controller. The robot control device 30 generates a control signal based on a previously input operation program. The robot control device 30 transmits the generated control signal to the robot 20 and causes the robot 20 to perform a predetermined work. Hereinafter, for the sake of convenience of explanation, the description of generation and transmission of the control signal by the robot control device 30 will be omitted, and when the robot control device 30 causes the robot 20 to perform an operation and operates the robot 20, the processing performed by the robot control device 30 will be described. The robot control device 30 may be configured to be incorporated in the robot 20, instead of a configuration installed outside the robot 20 as illustrated in FIG. 1.

Outline of Predetermined Work Performed by Robot

Hereinafter, the outline of the predetermined work performed by the robot 20 in the embodiment will be described.

The robot 20 in this example holds a first object from a gravity direction and a direction opposite to the gravity direction, and performs the operation of inserting the first object into an insertion portion provided in a second object as a predetermined work.

Hereinafter, as an example, a case where a negative direction of a Z axis in a robot coordinate system RC coincides with the gravity direction will be described. The robot coordinate system RC is a three-dimensional local coordinate system as a reference in a case where the robot control device 30 moves the arm A. The negative direction of the Z axis in the robot coordinate system RC may be configured to coincide with a direction different from the gravity direction.

In addition, hereinafter, as an example, a case where the first object is a male connector (plug or jack) PL1 in a connection cable for communication will be described. Instead of the connector PL1, the first object may be an industrial part, member, or device or the like, or may be a living body or the like.

In addition, hereinafter, as an example, a case where the second object is a female connector (receptacle) in the connection cable for communication and is a connector PL2 connected to the male connector PL1 serving as an example of the first object will be described. In this case, the connector PL2 is provided with an insertion portion PL21 as the insertion portion provided in the second object described above. Instead of the connector PL2, the second object may be an industrial part, member, or device or the like, or may be a living body or the like.

In the example illustrated in FIG. 1, the connector PL2 is supported by a jig G. In addition, in the example, the connector PL2 is supported by the jig G provided on a ground surface (for example, floor surface) of the robot 20. The connector PL2 may be configured to be supported by the jig G provided at another position such as a wall surface or a ceiling surface.

Here, a method of gripping the connector PL1 by the end effector E of the robot 20 will be described with reference to FIGS. 2 and 3.

Figure 2:
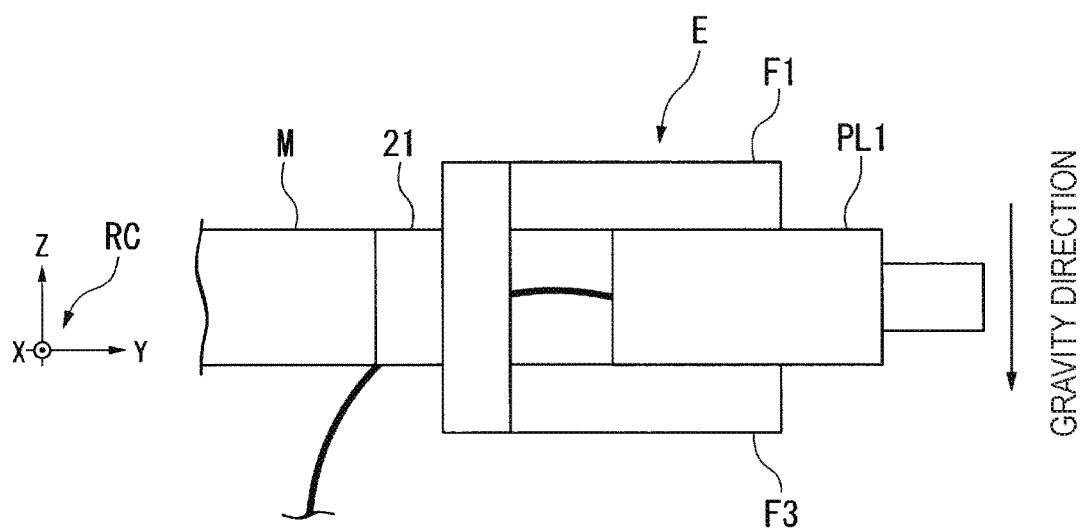
FIG. 2 is a side view illustrating an example of a case where a connector gripped by an end effector is viewed from a positive direction of an X axis toward a negative direction in a robot coordinate system.

FIG. 2 is a side view illustrating an example of a case where a connector PL1 gripped by an end effector E is viewed from a positive direction of an X axis toward a negative direction in a robot coordinate system RC. The side view is a side view in a case where a rotation axis of the joint that rotates the end effector E among the joints provided in the manipulator M coincides with a Y axis of the robot coordinate system RC. In addition, in FIG. 2, in order to clarify a relative positional relationship between the finger F1 and the finger F3 and the connector PL1, the fingers F2 and F4 are omitted.

As illustrated in FIG. 2, the end effector E causes each of the finger F1 and the finger F3 to operate, and grips the connector PL1 by holding the connector PL1 from the gravity direction and the direction opposite to the gravity direction. As described above, in this example, the gravity direction is the negative direction of the Z axis in the robot coordinate system RC. That is, the end effector E moves the finger F1 in the gravity direction to approach the connector PL1, and moves the finger F3 in the direction opposite to the gravity direction to approach the connector PL1. Therefore, the end effector E holds the connector PL1 with the finger F1 and the finger F3 to grip the connector PL1. Therefore, in the example illustrated in FIG. 2, the finger F1 comes into contact with a portion on the positive direction side of the Z axis among the portions of the connector PL1, and the finger F3 comes into contact with a portion on the negative direction side of the Z axis among the portions of the connector PL1.

In this manner, the robot 20 can suppress a shifting of the relative positional relationship between the end effector E serving as a portion holding the connector PL1 among the portions of the robot 20 and the connector PL1 in the gravity direction, depending on the weight of the connector PL1 and the weight of the cable provided in the connector PL1. In a case where the positional relationship does not shift in the gravity direction, the robot 20 can omit the operation in the direction along the gravity direction among the operations of searching the insertion portion PL21 when the connector PL1 is inserted into the insertion portion PL21. As a result, the robot 20 can shorten the time for inserting the connector PL1 into the insertion portion PL21 of the connector PL2.

Figure 3:
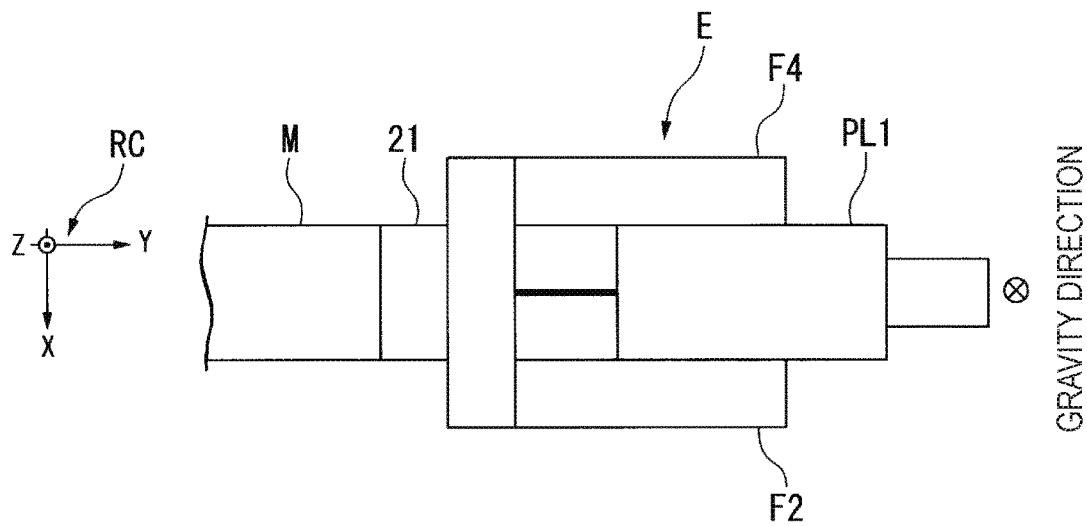
FIG. 3 is a top view illustrating a case where the end effector and the connector illustrated in FIG. 2 are viewed from a positive direction in a Z axis direction toward a negative direction in a robot coordinate system.

FIG. 3 is a top view illustrating a case where the end effector E and the connector PL1 illustrated in FIG. 2 are viewed from a positive direction in a Z axis direction toward a negative direction in a robot coordinate system. RC. In FIG. 3, in order to clarify the relative positional relationship between the finger F2 and the finger F4 and the connector PL1, the fingers F1 and F3 are omitted.

As illustrated in FIG. 3, the end effector E operates each of the finger F2 and the finger F4, and grips the connector PL1 in a state where the connector PL1 is regulated in a direction orthogonal to the gravity direction. In the example illustrated in FIG. 3, the end effector E moves the finger F2 in the negative direction of the X axis among the directions orthogonal to the gravity direction to approach the connector PL1, and moves the finger F4 in the positive direction of the X axis among the directions orthogonal to the gravity direction to approach the connector PL1. Therefore, the end effector E realizes a state where the connector PL1 is held by the finger F2 and the finger F4, and the connector PL1 is regulated in the direction orthogonal to the gravity direction. Therefore, in the example illustrated in FIG. 3, the finger F2 comes into contact with a portion on the positive direction side of the X axis among the portions of the connector PL1, and the finger F4 comes into contact with a portion on the negative direction side of the X axis among the portions of the connector PL1.

In this manner, the robot 20 can suppress a shifting of the relative positional relationship between the end effector E serving as a portion holding the connector PL1 among the portions of the robot 20 and the connector PL1 in the gravity direction, and can suppress a shifting of the positional relationship in the direction orthogonal to the gravity direction. In a case where the positional relationship does not shift in this direction, when the connector PL1 is inserted into the insertion portion PL21, the robot 20 can further omit the operation in the direction along this direction among the operations of searching the insertion portion PL21. As a result, the time required for the robot 20 to insert the connector PL1 into the insertion portion PL21 of the connector PL2 can be further shortened.

In the example illustrated in FIG. 1, as illustrated in FIGS. 2 and 3, the robot 20 is in a state where the connector PL1 held from both of the gravity direction and the direction opposite to the gravity direction, and previously grips the connector PL1 in a fixed state where the connector PL1 is regulated in the direction orthogonal to the gravity direction by each of the fingers F1 to F4. The robot 20 may be configured to grip the connector PL1 disposed in a predetermined feed region in a fixed state, without previously gripping the connector PL1. In addition, the robot 20 may be configured to perform another work as a predetermined work. In addition, the fixed state may be a state where the connector PL1 is not regulated in a direction orthogonal to the gravity direction, and a state where the robot 20 holds the connector PL1 from the gravity direction and the direction opposite to the gravity direction.

Outline of Processing Performed by Robot Control Device

Hereinafter, in order to cause the robot 20 in the embodiment to perform a predetermined work, the outline of the processing performed by the robot control device 30 will be described.

Hereinafter, as an example, a case where the connector PL2 is supported by the jig G so that the positive direction of the Y axis in the robot coordinate system RC coincides with a first direction A1 serving as the direction where the connector PL1 is inserted into the insertion portion PL21 will be described. That is, in this example, the direction opposite to the direction where the connector PL1 inserted in the insertion portion PL21 is pulled out from the insertion portion PL21 (first direction A1) coincides with the positive direction of the Y axis. The connector PL2 may be configured to be supported by the jig G so that the direction where the connector PL1 is inserted into the insertion portion PL21 coincides with the other direction different from the positive direction of the Y axis.

In addition, in this example, a control point T serving as a tool center point (TCP) moving with the center is set at the center of a tip end portion of the connector PL1. The tip end portion of the connector PL1 is an end portion on the side of being inserted into the insertion portion PL21 among the end portions of the connector PL1. In a state where the connector PL1 is inserted into the insertion portion PL21 provided in the connector PL2 supported by the jig G, the tip end portion of the connector PL1 has a surface orthogonal to the first direction A1. The shape of the surface is, for example, a rectangle. That is, the center of the tip end portion of the connector PL1 in this example is a centroid of the rectangle.

A control point coordinate system CC serving as a three-dimensional local coordinate system representing a position and posture of the connector PL1 is set at the control point T. An origin of the control point coordinate system CC represents the position of the control point T, that is, the center of the tip end portion of the connector PL1. In addition, the direction of each coordinate axis in the control point coordinate system. CC represents a posture of the control point T, that is, the center of the tip end portion of the connector PL1. For example, at the control point T, in a state where the connector PL1 is inserted in the insertion portion PL21, the control point coordinate system CC is set so that the positive direction of the Z axis in the control point coordinate system CC coincides with the positive direction of the Y axis in the robot coordinate system RC, and the positive direction of the X axis in the control point coordinate system CC coincides with the positive direction of the X axis in the robot coordinate system RC.

The robot control device 30 causes the arm A to move the connector PL1, based on position information which is information indicating the position of the insertion portion PL21 of the connector PL2 previously stored and standby position information described later. Therefore, the robot control device 30 moves the control point T of the connector PL1 to a predetermined standby position and causes the posture of the control point T to coincide with a predetermined standby posture.

The standby position is a position indicating a starting point of the control point T in a first insertion operation serving as an operation of bringing the connector PL1 closer to the connector PL2 among the operations that the robot control device 30 causes the robot 20 to perform in a predetermined work. In addition, in this example, the predetermined standby posture is a posture in which the positive direction of the Z axis in the control point coordinate system CC coincides with the positive direction of the Y axis in the robot coordinate system RC, and the positive direction of the X axis in the control point coordinate system CC coincides with the positive direction of the X axis in the robot coordinate system RC. Hereinafter, as an example, a case where the posture of the control point T coincides previously with the standby posture will be described. In this case, the robot control device 30 may be configured to move the control point T while maintaining the posture of the control point T while moving the control point T from the position of the current control point T to the standby position, or may be configured to move the position of the control point T to the standby position while changing the posture of the control point T during that time.

In a case where the fixed state is a state where the connector PL1 is not regulated in a direction orthogonal to the gravity direction and the robot 20 holds the connector PL1 from the gravity direction and the direction opposite to the gravity direction, it is preferable that the robot control device 30 is configured to move the control point T while maintaining the posture of the control point T while moving the control point T from the position of the current control point T to the standby position. In this manner, the robot control device 30 can prevent the relative positional relationship between the end effector E and the connector PL1 from being shifted in the direction orthogonal to the gravity direction due to gravity in the movement of the connector PL1 by the arm A.

In addition, in this example, the position of the insertion portion PL21 is represented by the position of the center of the tip end portion of the insertion portion PL21. The tip end portion of the insertion portion PL21 is the end portion on the side where the connector PL1 is inserted among the end portions of the insertion portion PL21. The tip end portion of the insertion portion PL21 has a surface orthogonal to the first direction A1 in a state of being supported by the jig G. The shape of the surface is, for example, a rectangle. That is, the center of the tip end portion of the insertion portion PL21 in this example is a centroid of the rectangle. The position of the insertion portion PL21 may be another position associated with the centroid, instead of this.

The position information previously stored in the robot control device 30 may be information indicating the relative position from a reference position serving as a position of a reference to the position of the insertion portion PL21, instead of the information indicating the position of the insertion portion PL21. For example, in a case where the robot 20 is installed on a mount, and where the mount on which the robot 20 is installed and the mount on which the jig G supporting the connector PL2 is installed are different mounts, the position of the insertion portion PL21 indicated by the position information previously stored in the robot control device 30 and the position of the current insertion portion PL21 may be shifted due to vibration or the like in some cases. In addition, in a case where an instruction to store the position of the insertion portion PL21 in the robot control device 30 is performed, the instruction may not be performed because there is another object that interferes with the surroundings in some cases, for example.

In this case, the reference position is provided on the mount on which the jig G is installed, and information indicating the relative position from the reference position to the insertion portion PL21 is previously stored in the robot control device 30. Therefore, the robot control device 30 again stores only the reference position so that the predetermined work can be performed. As a result, the user can cause the robot control device 30 to perform a predetermined work without storing the position of the insertion portion PL21.

The robot controller 30 causes the arm A to move the control point T to the standby position serving as the starting point in the first insertion operation, and thereafter causes the robot 20 to perform the first insertion operation so as to start bringing the connector PL1 closer to the connector PL2. Specifically, the robot control device 30 causes the arm A to start moving the connector PL1 in the first direction A1 serving as a direction where the connector PL1 and the connector PL2 approach each other. While the first insertion operation is performed, the robot control device 30 repeats determining whether or not the connector PL1 comes into contact with the position different from the insertion portion PL21 based on the force detection information.

As long as the robot control device 30 continues to determine that the connector PL1 does not come into contact with the position different from the insertion portion PL21 based on the force detection information, the robot control device 30 causes the robot 20 to continue the first insertion operation. The robot control device 30 causes the arm A to insert the connector PL1 into the insertion portion PL21.

On the other hand, in a case where the robot control device 30 determines that the connector PL1 comes into contact with a position different from the insertion portion PL21 while the first insertion operation is performed based on the force detection information, the robot control device 30 causes the arm A to separate the connector PL1 and the connector PL2 from each other.

In this manner, in a case where the connector PL1 comes into contact with a position different from the insertion portion PL21 provided in the connector PL2, the robot control device 30 can prevent the connector PL1 and the connector PL2 from being deformed.

In addition, when the connector PL1 and the connector PL2 are separated from each other, the robot control device 30 sets a position different from the standby position at the latest timing as a new standby position among the timings when the control point T stands by at the standby position in the past, and moves the control point T to the new standby position. In this manner, the robot control device 30 separates the connector PL1 and the connector PL2 from each other, and changes the relative positional relationship between the past standby position and the position of the insertion portion PL21 to the relative positional relationship between the new standby position and the insertion portion PL21. That is, each time the robot control device 30 separates the connector PL1 and the connector PL2 from each other, the robot control device 30 changes the starting point of the control point T in the first insertion operation to the starting point different from the starting point in the past. The robot control device 30 causes the robot 20 to again perform the first insertion operation so as to bring the connector PL1 closer to the connector PL2.

In this manner, even in a case where it is determined that the connector PL1 comes into contact with the position different from the insertion portion PL21 based on the force detection information, the robot control device 30 repeats the process of bringing the connector PL1 closer to the connector PL2 by the arm A and separating the connector PL1 from the connector PL2. Therefore, it is possible to prevent one or both of the connector PL1 and the connector PL2 from being deformed, and to insert the connector PL1 into the insertion portion PL21.

Hereinafter, in a case where it is determined that the connector PL1 comes into contact with the position different from the insertion portion PL21 based on the force detection information, the process by which the robot control device 30 separates the connector PL1 and the connector PL2 from each other will be described in detail.

Specific Examples of Connector Specifications

Hereinafter, specific examples of specifications of the connector PL1 and the connector PL2 will be described with reference to FIG. 4. FIG. 4 is a diagram illustrating a specific example of specifications of the connector PL1 and the connector PL2. As illustrated in FIG. 4, the specifications of the connector PL1 and the connector PL2 are, for example, USB-A type and a high-definition multimedia interface (HDMI, registered trademark).

In a case where the specifications of the connector PL1 and the connector PL2 are the USB-A type, the pressure required to insert the connector PL1 into the insertion part PL21 of the connector PL2 is, for example, 10 to 15 newtons. In addition, the gripping pressure which is the pressure required for the end effector E to grip the connector PL1 in order to generate the pressure, is, for example, 10.3 newtons.

In addition, in a case where the specifications of the connector PL1 and the connector PL2 are the HDMI (registered trademark), the pressure required to insert the connector PL1 into the insertion portion PL21 of the connector PL2 is, for example, 40 to 45 newtons. In addition, the gripping pressure which is the pressure required for the end effector E to grip the connector PL1 in order to generate the pressure, is, for example, 14 newtons.

The specifications of the connector PL1 and the connector PL2 may be another specifications instead of the USB-A type and the HDMI (registered trademark).

Hardware Configuration of Robot Control Device

Figure 5:
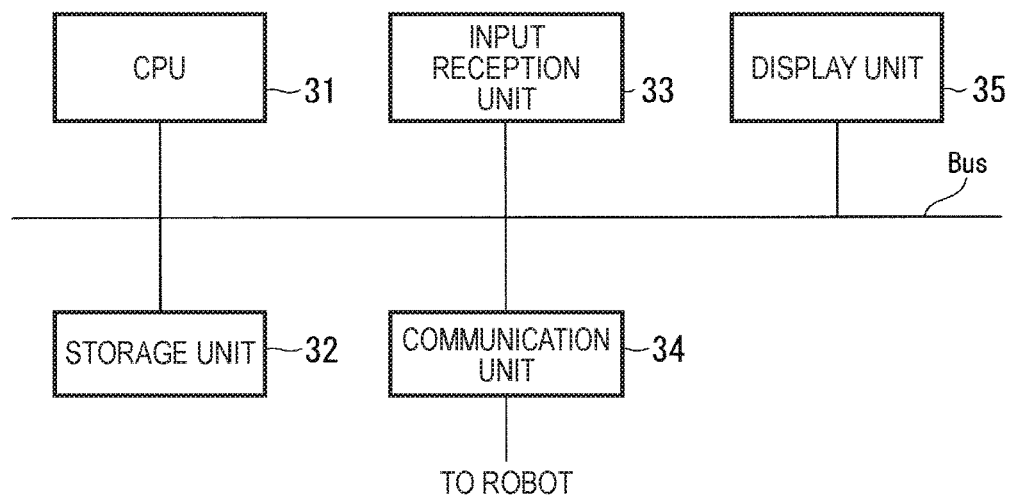
FIG. 5 is a diagram illustrating an example of a hardware configuration of a robot control device.

Hereinafter, a hardware configuration of the robot control device 30 will be described with reference to FIG. 5. FIG. 5 is a diagram illustrating an example of a hardware configuration of a robot control device 30. The robot control device 30 is provided with, for example, a central processing unit (CPU) 31, a storage unit 32, an input reception unit 33, a communication unit 34, and a display unit 35. These components are communicably connected to each other via a bus Bus. In addition, the robot control device 30 communicates with the robot 20 via the communication unit 34.

The CPU 31 executes various programs stored in the storage unit 32.

The storage unit 32 includes, for example, a hard disk drive (HDD), a solid state drive (SSD), an electrically erasable programmable read-only memory (EEPROM), a read-only memory (ROM), a random access memory (RAM), or the like. The storage unit 32 may be an externally attached storage device connected by a digital input/output port such as USB or the like, instead of being incorporated in the robot control device 30. The storage unit 32 stores various kinds of information, images, programs, position information, standby position information, and the like processed by the robot control device 30. Here, the standby position information will be described.

The standby position information includes information in which the information indicating the relative position from the standby position to the position of the insertion portion PL21 and the information indicating the execution order of the first insertion operation repeatedly performed in the predetermined work by the robot 20 are associated with each other. For example, in a case where the execution order is 0, the information indicating the relative position from the standby position to the position of the insertion portion PL21, which is the position associated with the information indicating the execution order, is information indicating the relative position from the standby position to the position of the insertion portion PL21, which is the position in the first insertion operation for the first time. In addition, in a case where the execution order is 1, the information indicating the relative position from the standby position to the position of the insertion portion PL21, which is the position associated with the information indicating the execution order, is information indicating the relative position from the standby position to the position of the insertion portion PL21, which is the position in the first insertion operation for the second time. That is, each time the robot control device 30 causes the robot 20 to perform the first insertion operation based on the position of the insertion portion PL21 indicated by the position information and the standby position information, the robot control device 30 specifies a standby position according to the execution order of the first insertion operation, and moves the control point T to the standby position.

The input reception unit 33 is, for example, a teaching pendant including a keyboard, a mouse, a touch pad, and the like, and other input devices. The input reception unit 33 may be configured to be integrated with the display unit 35 as a touch panel.

The communication unit 34 is configured to include, for example, a digital input/output port such as a USB, an Ethernet (registered trademark) port, and the like.

The display unit 35 is, for example, a liquid crystal display panel or an organic electro luminescence (EL) display panel.

Functional Configuration of Robot Control Device

Figure 6:
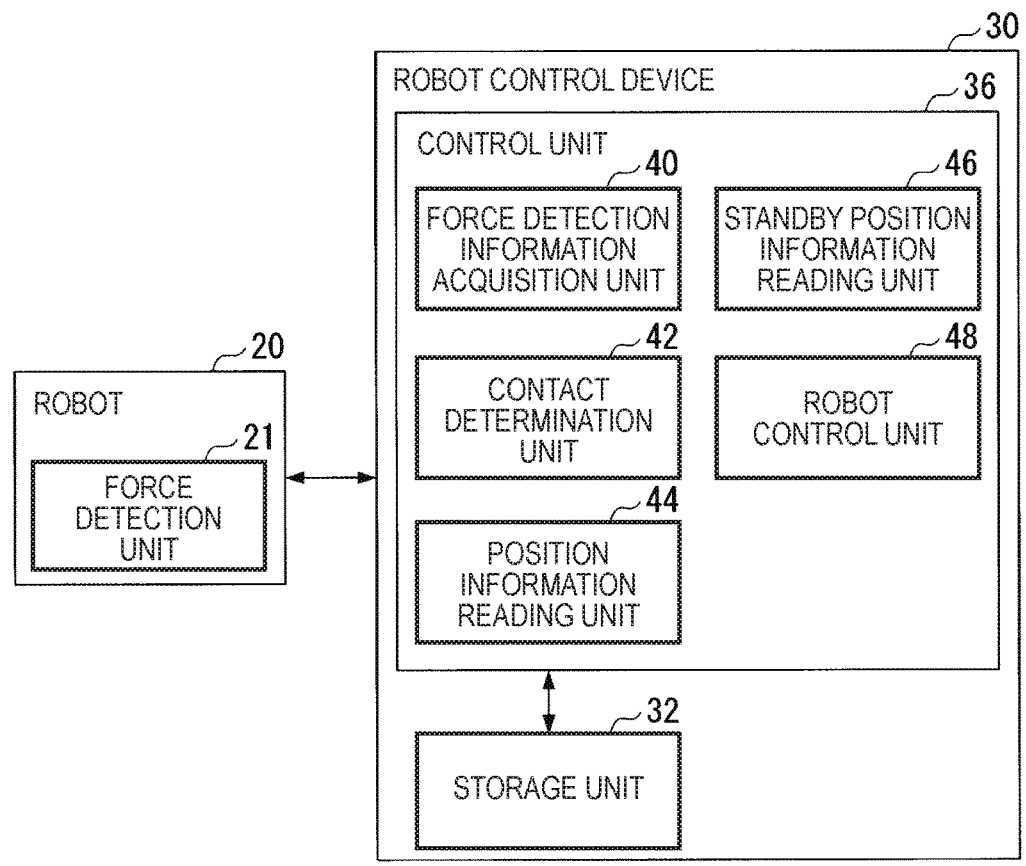
FIG. 6 is a diagram illustrating an example of a functional configuration of the robot control device.

Hereinafter, a functional configuration of the robot control device 30 will be described with reference to FIG. 6. FIG. 6 is a diagram illustrating an example of a functional configuration of the robot control device 30. The robot control device 30 is provided with the storage unit 32 and a control unit 36.

The control unit 36 controls the entire robot control device 30. The control unit 36 is provided with a force detection information acquisition unit 40, a contact determination unit 42, a position information reading unit 44, a standby position information reading unit 46, and a robot control unit 48. These functional units provided in the control unit 36 are realized, for example, by the CPU 31 that executes various programs stored in the storage unit 32. In addition, a part or all of these functional units may be hardware functional units such as large scale integration (LSI) and an application specific integrated circuit (ASIC).

The force detection information acquisition unit 40 acquires force detection information from the force detection unit 21.

The contact determination unit 42 determines whether or not the first object comes into contact with the position different from the insertion portion (for example, insertion portion PL21 described above) provided in the second object, based on the force detection information acquired by the force detection information acquisition unit 40.

The position information reading unit 44 reads the position information from the storage unit 32.

The standby position information reading unit 46 reads the standby position information from the storage unit 32.

The robot control unit 48 causes the robot 20 to operate, based on a part or all of the force detection information acquired by the force detection information acquisition unit 40, the determination result determined by the contact determination unit 42, the position information read by the position information reading unit 44 from the storage unit 32, and the standby position information read by the standby position information reading unit 46 from the storage unit 32.

Figure 7:
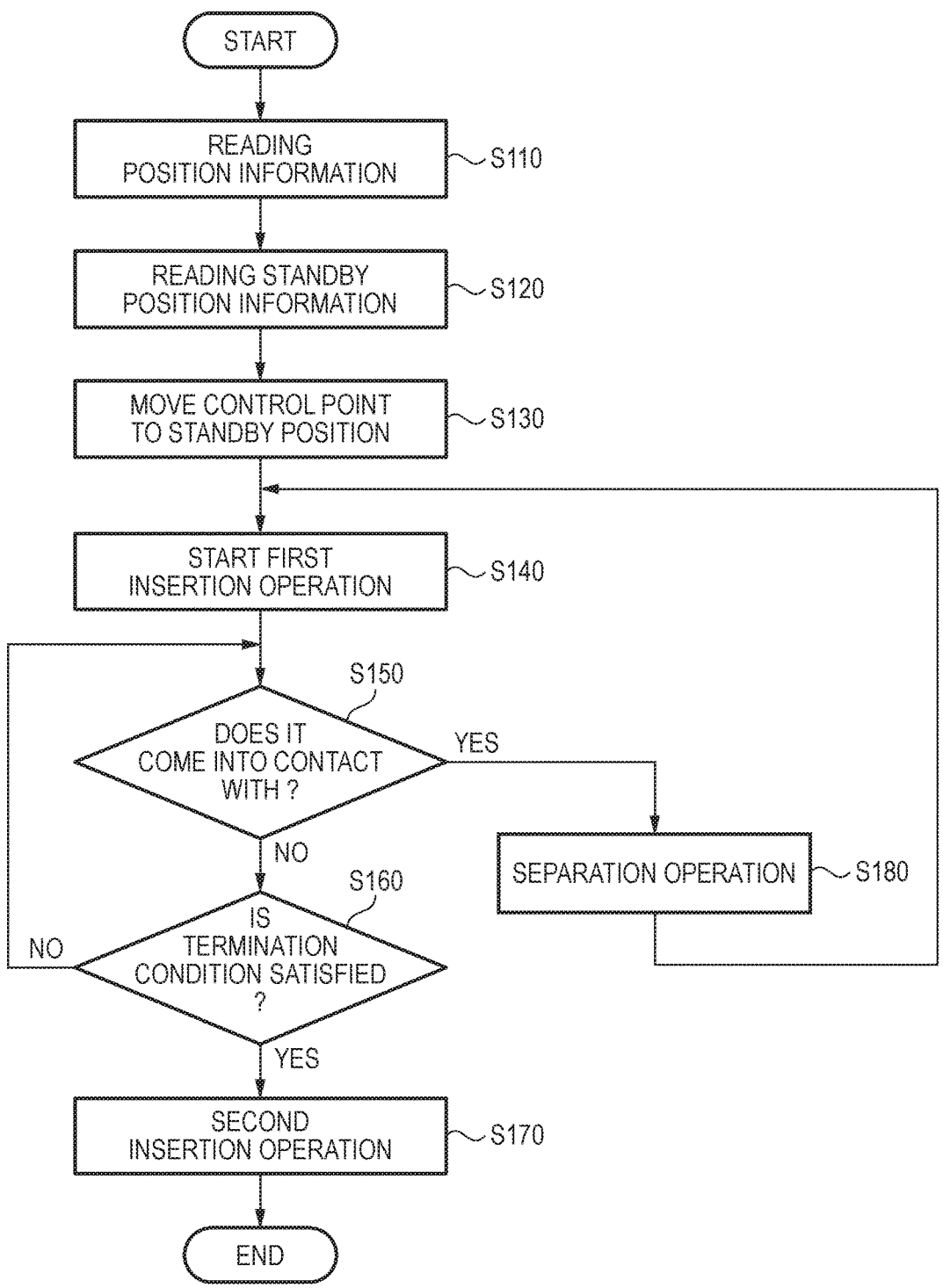
FIG. 7 is a flowchart illustrating an example of a flow of a process in which the robot control device causes a robot to perform a predetermined work.

Process in which Robot Control Device Causes Robot to Perform Predetermined Work Hereinafter, a process in which the robot control device 30 causes the robot 20 to perform a predetermined work will be described with reference to FIG. 7. FIG. 7 is a flowchart illustrating an example of a flow of a process in which the robot control device 30 causes the robot 20 to perform a predetermined work.

The position information reading unit 44 reads the position information previously stored in the storage unit 32 from the storage unit 32 (Step S110). Next, the standby position information reading unit 46 reads the standby position information previously stored in the storage unit 32 from the storage unit 32 (Step S120).

Next, the robot control unit 48 operates the arm A to move the control point T to the initial standby position, and to causes a posture of the control point T at the standby position to coincide with the predetermined standby posture described above (Step S130), based on the position of the insertion portion PL21 indicated by the position information read by the position information reading unit 44 from the storage unit 32 in Step S110, and the standby position information read by the standby position information reading unit 46 from the storage unit 32 in Step S120. The robot control unit 48 initializes so that the information indicating the execution order of the first insertion operation indicates 0, and stores the information. Here, the process of Step S130 will be described with reference to FIG. 8.

Figure 8:
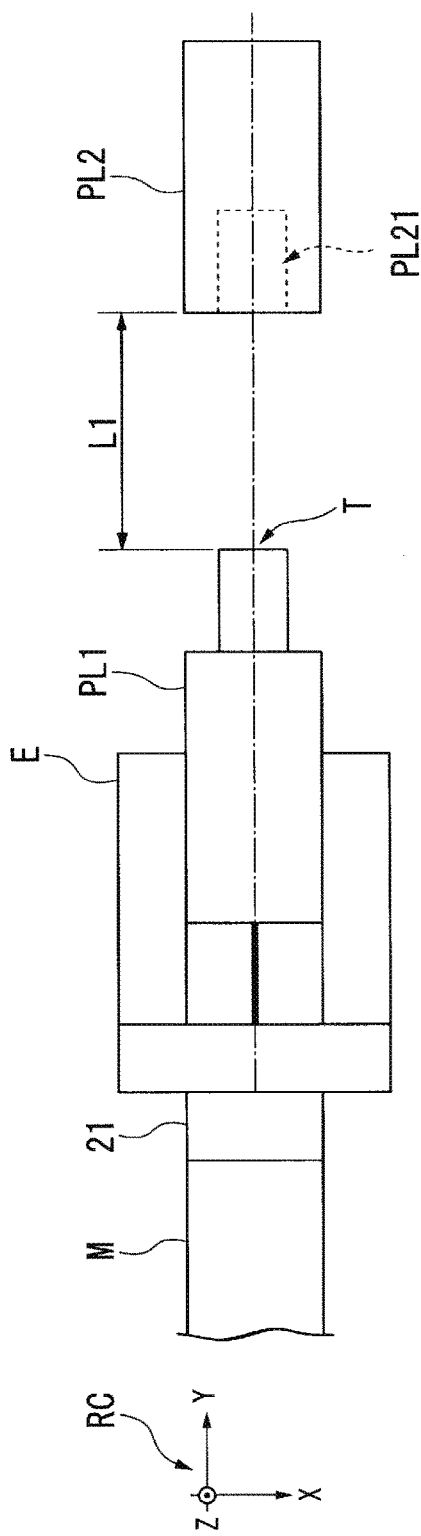
FIG. 8 is a diagram illustrating an example of a state of the connector and the connector in a case where a control point moves to a standby position in a first insertion operation for the first time.

FIG. 8 is a diagram illustrating an example of a state of the connector PL1 and the connector PL2 in a case where a control point T moves to a standby position in a first insertion operation for the first time. A three-dimensional local coordinate system illustrated in FIG. 8 is the robot coordinate system RC. As illustrated in FIG. 8, the standby position in the first insertion operation for the first time is a position separated by a distance L1 from the surface of the tip end portion of the insertion portion PL21 toward the negative direction of the Y axis in the robot coordinate system RC, in a case where the posture of the connector PL1 is the standby posture. The distance L1 is, for example, 10 millimeters. The distance L1 may be another distance, instead of this.

Figure 9:
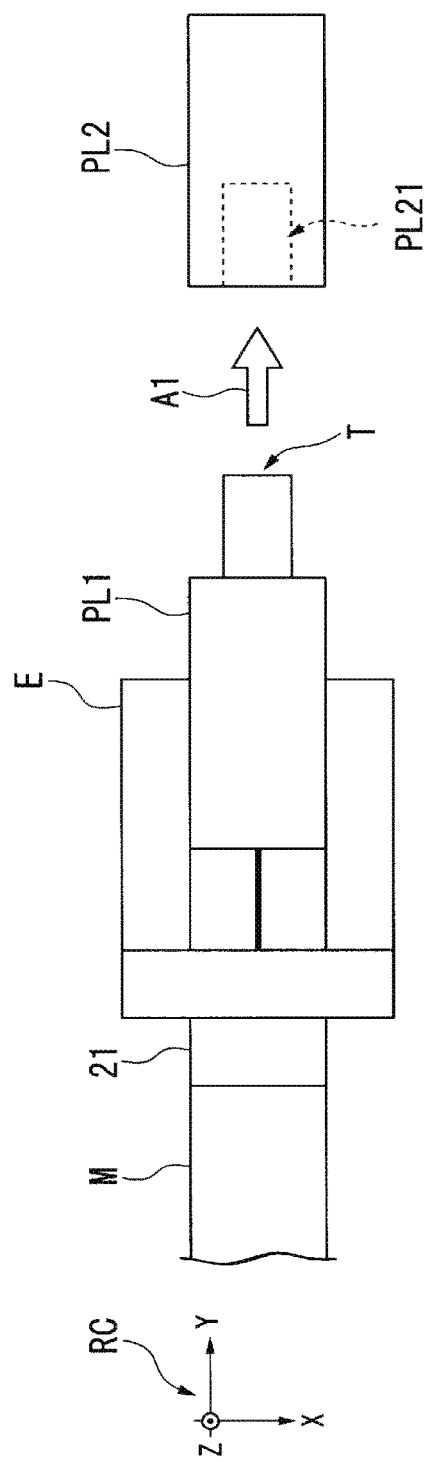
FIG. 9 is a diagram illustrating an example of a state of the connector and the connector immediately after the first insertion operation is started.

Next, the robot control unit 48 causes the robot 20 to start the first insertion operation (Step S140). Here, the process of Step S140 will be described with reference to FIG. 9. FIG. 9 is a diagram illustrating an example of a state of the connector PL1 and the connector PL2 immediately after the first insertion operation is started. A three-dimensional local coordinate system illustrated in FIG. 9 is the robot coordinate system RC. As illustrated in FIG. 9, the robot control unit 48 causes the arm A to start moving the connector PL1 along the first direction A1 where the connector PL1 and the connector PL2 approach each other. As described above, the first direction A1 is the positive direction of the Y axis in the robot coordinate system RC in this example. In addition, in the first insertion operation, the robot control unit 48 performs the first insertion operation under the control based on the force detection information acquired by the force detection information acquisition unit 40 from the force detection unit 21.

Next, in the first insertion operation started from Step S140, the contact determination unit 42 determines whether or not the connector PL1 comes into contact with the position different from the insertion portion PL21 (Step S150), based on the force detection information acquired by the force detection information acquisition unit 40 from the force detection unit 21. In a case where it is determined that the force applied to the connector PL1 in the direction opposite to the first direction A1 is equal to or larger than a predetermined threshold, based on the force detection information acquired from the force detection unit 21, the contact determination unit 42 determines that the connector PL1 comes into contact with the position different from the insertion portion PL21. The predetermined threshold is a force larger than the minimum force (for example, required insertion pressure illustrated in FIG. 4) required for inserting the connector PL1 into the insertion portion PL21. For example, in a case where the specifications of the connector PL1 and the connector PL2 are the USB-A type illustrated in FIG. 4, the predetermined threshold is a force greater than 10 newtons. On the other hand, in a case where it is determined that the force applied to the connector PL1 in the direction opposite to the first direction A1 is smaller than the predetermined threshold, based on the force detection information acquired from the force detection unit 21, the contact determination unit 42 determines that the connector PL1 does not come into contact with the position different from the insertion portion PL21. In a case where the contact determination unit 42 determines that the connector PL1 does not come into contact with the position different from the insertion portion PL21 (NO in Step S150), the robot control unit 48 determines whether or not a termination condition that is a condition for terminating the first insertion operation is satisfied (Step S160). Here, the termination condition will be described with reference to FIG. 10.

Figure 10:
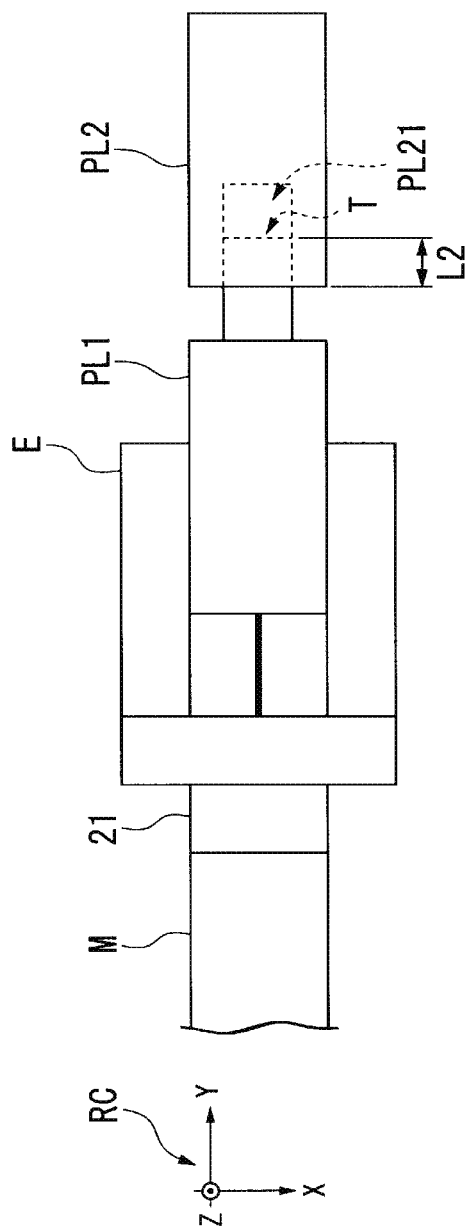
FIG. 10 is a diagram illustrating an example of a state of the connector and the connector in a case where a termination condition is satisfied.

FIG. 10 is a diagram illustrating an example of a state of the connector PL1 and the connector PL2 in a case where a termination condition is satisfied. A three-dimensional local coordinate system illustrated in FIG. 10 is the robot coordinate system RC. In this example, the termination condition is that the position of the control point T in the direction along the Y axis in the robot coordinate system RC is separated by a distance L2 or more from the surface of the tip end portion of the insertion portion PL21 toward the first direction A1 side. In the example illustrated in FIG. 10, the position of the control point T is separated from the surface by the distance L2 along the Y axis toward the first direction A1 side. The distance L2 is, for example, 5 millimeters. The distance L2 may be another distance, instead of this. In addition, the termination condition may be another condition, instead of this.

In Step S160, in a case where the robot control unit 48 determines that the termination condition is not satisfied (NO in Step S160), the contact determination unit 42 proceeds to step S150 and determines again whether or not the connector PL1 comes into contact with the position different from the insertion portion PL21. On the other hand, in a case where it is determined that the termination condition is satisfied (YES in Step S160), the robot control unit 48 stops the movement of the control point T toward the first direction A1 and terminates the first insertion operation. The robot control unit 48 causes the robot 20 to perform a second insertion operation (step S170) for moving the connector PL1 in the first direction A1 until the connector PL1 is completely inserted into the connector PL2, and causes the end effector E to release the connector PL1. Thereafter, the robot control unit 48 causes the arm A to move to a predetermined termination position, and terminates the process. Here, the second insertion operation in Step S170 will be described with reference to FIG. 11.

Figure 11:
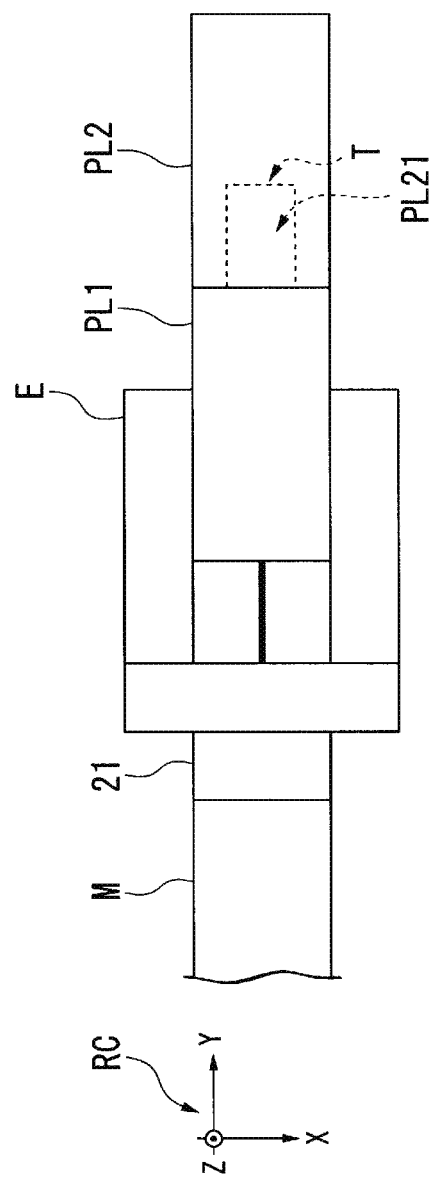
FIG. 11 is a diagram illustrating an example of a state of the connector and the connector after a second insertion operation is performed.

FIG. 11 is a diagram illustrating an example of a state of the connector PL1 and the connector PL2 after the second insertion operation is performed. A three-dimensional local coordinate system illustrated in FIG. 11 is the robot coordinate system RC.

As illustrated in FIG. 11, the robot control unit 48 causes the arm A to move the connector PL1 to the first direction A1 until the connector PL1 is completely inserted into the connector PL2 in the second insertion operation. In this manner, The robot control unit 48 can completely connect the connector PL1 and the connector PL2. The second insertion operation may be another operation, instead of this.

On the other hand, in a case where the contact determination unit 42 determines that the connector PL1 comes into contact with the position different from the insertion portion PL21 in step S150 (YES in Step S150), the robot control unit 48 increases the execution order indicated by the information indicating the execution order of the first insertion operation in the predetermined work by one. The robot control unit 48 specifies the standby position corresponding to the number of times the first insertion operation is performed, based on the position of the insertion portion PL21 indicated by the position information read from the storage unit 32 by the position information reading unit 44 in Step S110, the standby position information read from the storage unit 32 by the standby position information reading unit 46 in Step S120, and information indicating the execution order. The robot control unit 48 causes the arm A to move the connector PL1 based on the specified standby position in a direction that is other than the direction opposite to the direction where the connector PL1 and the connector PL2 approach each other (in this example, negative direction of Y axis in robot coordinate system RC), and is a direction orthogonal to the gravity direction among the directions where the connector PL1 and the connector PL2 separate from each other. Therefore, the robot control unit 48 separates the connector PL1 and the connector PL2 from each other, and causes the robot 20 to perform a separation operation for moving the control point T to the standby position (Step S180). After the separation operation is performed in Step S180, the robot control unit 48 proceeds to Step S140 and starts the first insertion operation again. Here, the state of the connector PL1 and the connector PL2 in a case where the connector PL1 comes into contact with the position different from the insertion portion PL21 and the separation operation in Step S180 will be described with reference to FIGS. 12 and 13.

Figure 12:
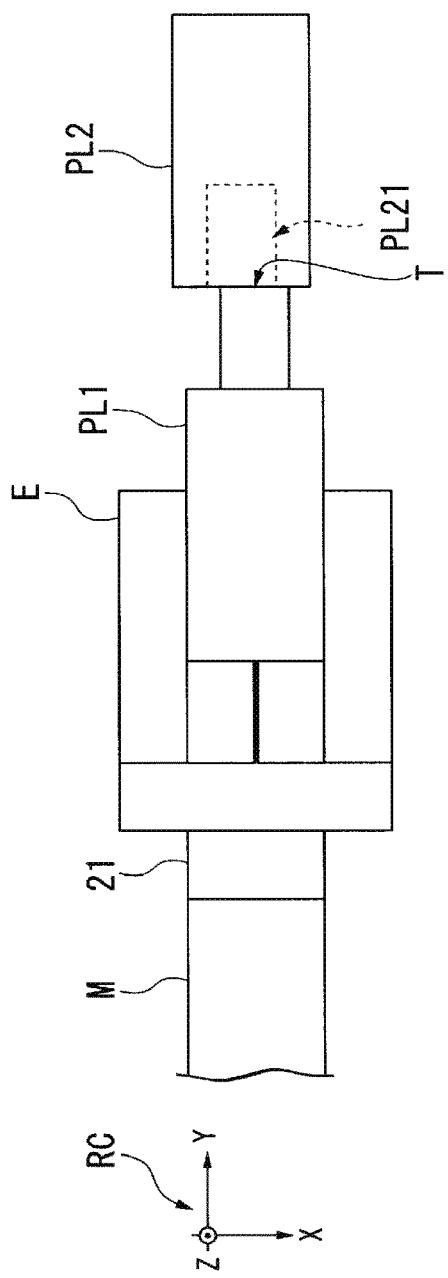
FIG. 12 is a diagram illustrating an example of a state of the connector and the connector in a case where the connector comes into contact with a position different from an insertion portion.

FIG. 12 is a diagram illustrating an example of a state of the connector PL1 and the connector PL2 in a case where the connector PL1 comes into contact with a position different from an insertion portion PL21. Even in a case where the control point T is moved to the standby position in the first insertion operation for the first time in Step S130, due to an error such as an error due to the rigidity of the arm A and an error related to a position where the support base B is installed, the connector PL1 is come into contact with the position different from the insertion portion PL21 in the insertion portion PL21 of the connector PL1 in some cases. The state illustrated in FIG. 12 illustrates an example of a state where the connector PL1 is come into contact with the position different from the insertion portion PL21 due to such an error. In Step S150, in a case where the contact determination unit 42 determines that the connector PL1 comes into contact with the position different from the insertion portion PL21, the robot control unit 48 performs the separation operation in Step S180 as illustrated in FIG. 13.

Figure 13:
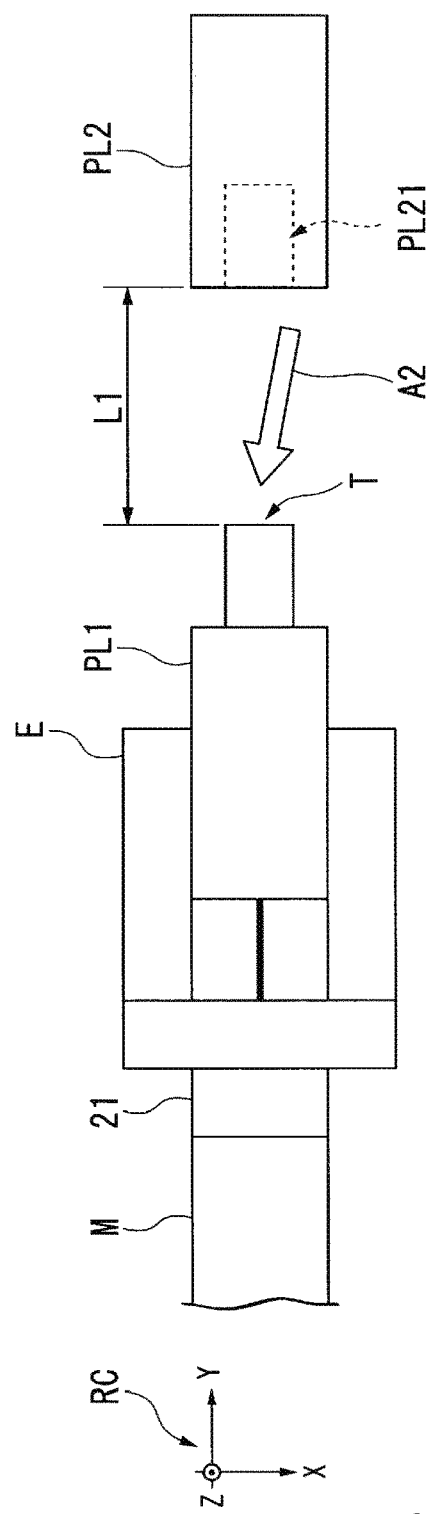
FIG. 13 is a diagram illustrating an example of a state of the connector and the connector after a separation operation is performed.

FIG. 13 is a diagram illustrating an example of a state of the connector PL1 and the connector PL2 after a separation operation is performed. As illustrated in FIG. 13, the robot control unit 48 moves the control point T (that is, the connector PL1) in a direction that is other than the direction opposite to the direction where the connector PL1 and the connector PL2 approach each other, and is a direction orthogonal to the gravity direction among the directions where the connector PL1 and the connector PL2 separate from each other. Therefore, the robot control unit 48 separates the connector PL1 and the connector PL2 from each other, and causes the robot 20 to perform the separation operation for moving the control point T to the standby position different from the previous standby position. In this example, the direction is a direction on the XY plane in the robot coordinate system RC among the directions where the connector PL1 and the connector PL2 are separated from each other, and is a direction A2 other than the negative direction of the Y axis in the robot coordinate system RC. As in the case of the standby position in the first insertion operation for the first time, the standby position is a position separated from the surface of the tip end portion of the insertion portion PL21 by the distance L1 along the Y axis in the robot coordinate system RC on the side in the direction opposite to the first direction A1. However, after the separation operation, in a case where the surface is viewed toward the first direction A1, the position projected on the surface at the standby position is a position different from the position projected on the surface of the standby position in the first insertion operation for the first time.

In addition, in the separation operation, the robot control unit 48 moves the control point T from a position where the control point T is in contact and different from the insertion portion PL21, in the direction A2 with a movement trajectory as a straight line to separate the connector PL1 and the connector PL2 from each other. In this manner, the robot control unit 48 can shorten the time required for moving the connector PL1 to a position where the connector PL1 starts moving again in the direction where the connector PL1 and the connector PL2 approach each other (that is, standby position), after the connector PL1 and the connector PL2 are separated from each other. In the separation operation, the robot control unit 48 may be configured to move the control point T from a position where the control point T is in contact and different from the insertion portion PL21, in the direction A2 with the movement trajectory as other than the straight line to separate the connector PL1 and the connector PL2 from each other.

In addition, in the separation operation, when the control point T is moved from the position where the control point T is in contact and different from the insertion portion PL21 to the standby position, the robot control unit 48 moves the control point T by position control. That is, in the separation operation, the robot control unit 48 in this example does not perform control, based on the force detection information acquired by the force detection information acquisition unit 40 from the force detection unit 21. In the position control, the robot control unit 48 designates a standby position different from the previous standby position as a target position which is the target position for moving the control point T, and designates a standby posture as a target posture which is the target posture for changing the posture of the control point T. The robot control unit 48 causes the designated target position and target posture to coincide with the position and posture of the control point T. With such position control, the robot control device 30 can shorten the time to insert the connector PL1 into the insertion portion PL21 of the connector PL2. In the separation operation, the robot control unit 48 may be configured to perform control based on the force detection information acquired by the force detection information acquisition unit 40 from the force detection unit 21.

Figure 14:
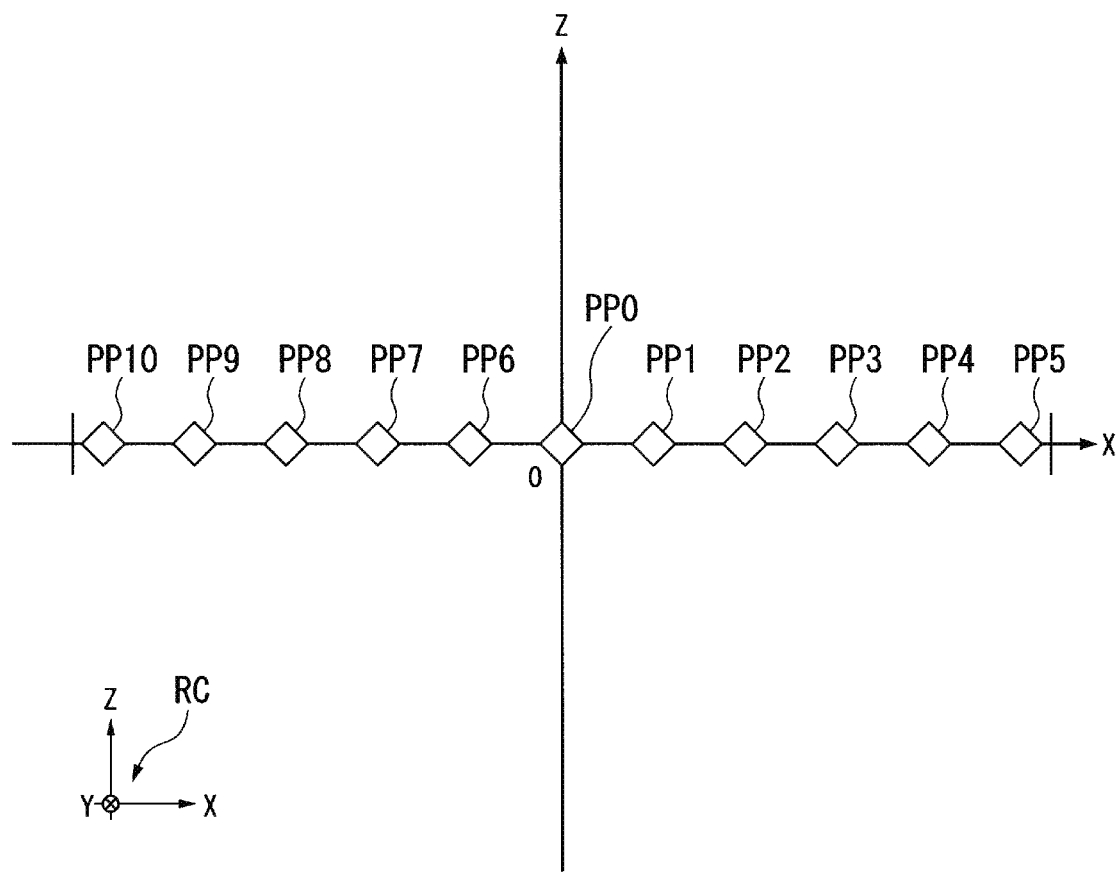
FIG. 14 is a diagram plotting an example of a position which is a standby position which changes each time the first insertion operation is performed, and is projected onto the surface on the side where the connector of the insertion portion is inserted on a two-dimensional graph with the center of a surface as an origin, in a case where the first insertion operation and the separation operation are performed twice or more.

In addition, in this example, in a case where the first insertion operation and the separation operation are performed twice or more, that is, in a case where the contact of the connector PL1 to the position different from the insertion portion PL21 and the separation of the connector PL1 and the connector PL2 are performed twice or more, as illustrated in FIG. 14, the robot control unit 48 changes the standby position along a linear trajectory based on the standby position information. FIG. 14 is a diagram plotting an example of a position which is a standby position which changes each time the first insertion operation is performed, and is projected onto the surface on the side of the insertion portion PL21 into which the connector PL1 is inserted on a two-dimensional graph with the center of a surface as an origin, in a case where the first insertion operation and the separation operation are performed twice or more.

A three-dimensional local coordinate system illustrated in FIG. 14 is the robot coordinate system RC. In the example illustrated in FIG. 14, the robot control unit 48 shifts the standby position from the origin to the positive direction of the X axis each time the first insertion operation is performed. In addition, in a case where the number of times of performing the first insertion operation reaches a predetermined number, the robot control unit 48 shifts the standby position from the origin to the negative direction of the X axis each time the first insertion operation is performed. In this example, the predetermined number is seven times, but instead of this, other number of times may be used. The robot control unit 48 may be configured to shift the standby position from the origin to the negative direction of the X axis each time the first insertion operation is performed. In this case, in a case where the number of times of performing the first insertion operation reaches the predetermined number, the robot control unit 48 shifts the standby position from the origin to the positive direction of the X axis every time the first insertion operation is performed. In addition, the robot control unit 48 may be configured to shift the standby position from the origin to only any one of the positive direction and the negative direction of the X axis each time the first insertion operation is performed.

As illustrated in FIG. 14, a point PP0 indicating the standby position in the first insertion operation for the first time is positioned at the origin in the two dimensional graph. In addition, a point PP1 indicating the standby position in the first insertion operation for the second time is positioned at a point shifted in the positive direction of the X axis from the origin in the two dimensional graph. In addition, a point PP2 indicating the standby position in the first insertion operation for the third time is positioned at a point shifted in the positive direction of the X axis from the point PP1 in the two dimensional graph. In addition, a point PP6 indicating the standby position in the first insertion operation for the seventh time which is the predetermined number is positioned at a point shifted in the negative direction of the X axis from the point PP0 in the two dimensional graph. In addition, a point PP7 indicating the standby position in the first insertion operation for the eighth time is positioned at a point shifted in the negative direction of the X axis from the point PP6 in the two dimensional graph. In the two dimensional graph illustrated in FIG. 14, 11 points indicating such standby positions are plotted. A point PP10 is a point indicating the standby position in the first insertion operation for the eleventh time. In this manner, each time the first insertion operation is performed, the robot control unit 48 changes the standby position along the linear trajectory based on the standby position information.

As described above, the robot control device 30 (or robot 20 incorporating robot control device 30) holds the connector PL1 from the gravity direction and the direction opposite to the gravity direction, and inserts the connector PL1 into the insertion portion PL21 provided in the connector PL2. In this manner, the robot control device 30 can suppress a shifting of the relative positional relationship between the end effector E serving as a portion holding the connector PL1 among the portions of the robot 20 and the connector PL1 in the gravity direction.

In addition, the robot control device 30 can insert the connector PL1 into the insertion portion PL21 while suppressing deformation of both the connector PL1 and the connector PL2. Therefore, the robot control device 30 can perform work that does not produce defective products at, for example, assembly plants of components and products, and as a result, it is possible to improve work efficiency and productivity.

In Step S140, the force detection unit 21 may be configured to initialize the force detected by the force detection unit 21 to 0 before the first insertion operation is performed. In addition, the robot control device 30 may be configured to set an upper limit to the number of times the separation operation is executed. For example, in a case where the upper limit of the number of times the separation operation is executed is three times, the robot control device 30 may be configured to display an error on the display unit 35 without executing the separation operation when the separation operation for the fourth time is executed.

In addition, the robot control device 30 may be configured to hold the connector PL2 from the gravity direction and the direction opposite to the gravity direction, and to insert the connector PL1 into the insertion portion PL21 provided in the connector PL2. In this case, the end effector E grips the connector PL2 in the fixed state instead of the connector PL1. In addition, in this case, the robot control device 30 causes the arm A to move the connector PL2 in a direction where the connector PL1 and the connector PL2 approach each other, and determines whether or not the connector PL1 comes into contact with the position different from the insertion portion PL21 based on the force detection information. In a case where it is determined that the connector PL1 comes into contact with the position different from the insertion portion PL21, the robot control device 30 separates the connector PL1 and the connector PL2 from each other.

In addition, in a case where the robot 20 is a multi arm robot, the robot control device 30 may be configured to cause the end effector E provided in the first arm A to grip the connector PL1, to cause the end effector E provided in the second arm A to grip the connector PL2, and to cause the two arms A to move the connector PL1 and the connector PL2 in a direction where the connector PL1 and the connector PL2 approach each other, and to determine that the connector PL1 comes into contact with the position different from the insertion portion PL21, based on the force detection information. In a case where it is determined that the connector PL1 comes into contact with the position different from the insertion portion PL21, the robot control device 30 may be configured to separate the connector PL1 from the connector PL2 from each other. In this case, the connector PL1 is gripped in the fixed state by the end effector E provided in the first arm A, and the connector PL2 is gripped in the fixed state by the end effector E provided in the second arm A.

In addition, in a case where the robot system 1 or the robot 20 is provided with the imaging unit, the robot control device 30 may be configured to cause the imaging unit to capture the captured image including the surface of the tip end portion of the insertion portion PL21, and to detect the position of the insertion portion PL21 based on the captured image. In this case, the control unit 36 may not include the position information reading unit 44.

In addition, in a case where the robot system 1 or the robot 20 includes the imaging unit, and in a case where the connector PL2 is moved in the direction where the connector PL1 and the connector PL2 approach each other by the arm A, the robot control device 30 may be configured to cause the imaging unit to capture the captured image including the surface of the tip end portion of the connector PL1, and to detect the position of the control point T based on the captured image.

In addition, in a case where the robot system 1 or the robot 20 includes the imaging unit, and in a case where the robot 20 is a multi arm robot, the connector PL1 is gripped in the fixed state by the end effector E provided in the first arm A, the connector PL2 is gripped in the fixed state by the end effector E provided in the second arm A, and the connector PL1 and the connector PL2 are moved by the two arms A in the direction where the connector PL1 and the connector PL2 approach each other, the robot control device 30 may be configured to cause the imaging unit to capture the captured image including the surface of the tip end portion of the connector PL1 and the surface of the tip end portion of the insertion portion PL21, and to detect the position at least any one of the control point T or the insertion portion PL21 based on the captured image.

In addition, a combination of the first object and the second object may be any combination as long as it is a combination of two objects to be fitted into each other, instead of a combination of the connector PL1 and the connector PL2. Modification example of method of gripping connector PL1 by end effector of robot Here, the modification example of method of gripping the connector PL1 by the end effector E of the robot 20 will be described with reference to FIGS. 15 to 17.

Figure 15:
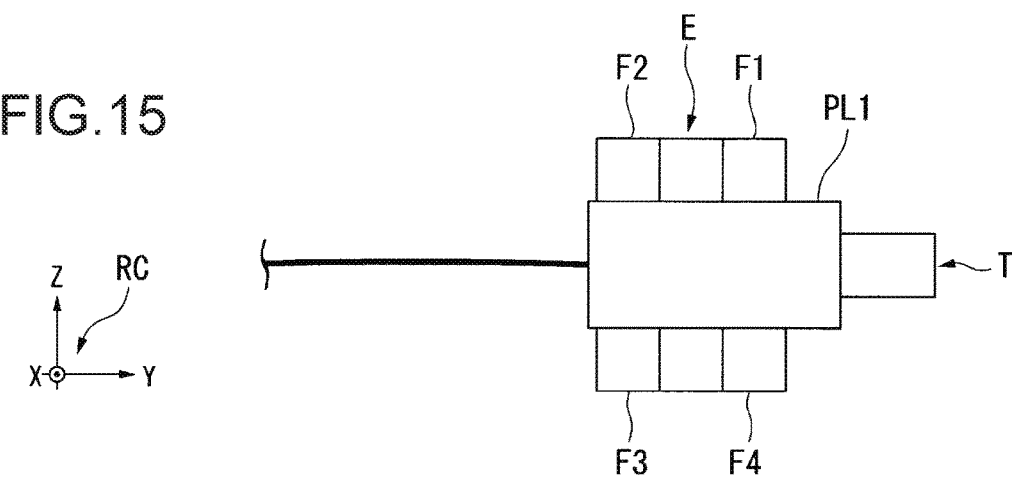
FIG. 15 is a side view illustrating another example in a case where the connector gripped by the end effector is viewed from a positive direction of an X axis toward a negative direction in a robot coordinate system.

FIG. 15 is a side view illustrating another example in a case where the connector PL1 gripped by the end effector E is viewed from a positive direction of an X axis toward a negative direction in a robot coordinate system RC. In the side view, the positive direction of the Z axis in the control point coordinate system CC coincides with the positive direction of the Y axis in the robot coordinate system. RC. In addition, in the side view, the rotation axis of the joint that rotates the end effector E among the joints provided in the manipulator M coincides with the X axis of the robot coordinate system RC.

In the example illustrated in FIG. 15, the end effector E operates each of the fingers F1 to F4, and holds the connector PL1 from the gravity direction and the direction opposite to the gravity direction so as to grip the connector PL1. In this example, the gravity direction is the negative direction of the Z axis in the robot coordinate system RC. That is, the end effector E moves the finger F1 and the finger F2 in the gravity direction to approach the connector PL1 and moves the finger F3 and the finger F4 in the direction opposite to gravity direction to approach the connector PL1. Therefore, the end effector E causes each of the fingers F1 to F4 to hold the connector PL1 and grips the connector PL1. Therefore, in the example illustrated in FIG. 15, the finger F1 and the finger F2 are in contact with the portion on the positive direction side of the Z axis among the portions of the connector PL1, and the finger F3 and the finger F4 are in contact with the portion on the negative direction side of the Z axis among the portions of the connector PL1.

In this manner, the robot 20 can suppress a shifting of the relative positional relationship between the end effector E serving as a portion holding the connector PL1 among the portions of the robot 20 and the connector PL1 in the gravity direction, depending on the weight of the connector PL1 and the weight of the cable provided in the connector PL1.

Figure 16:
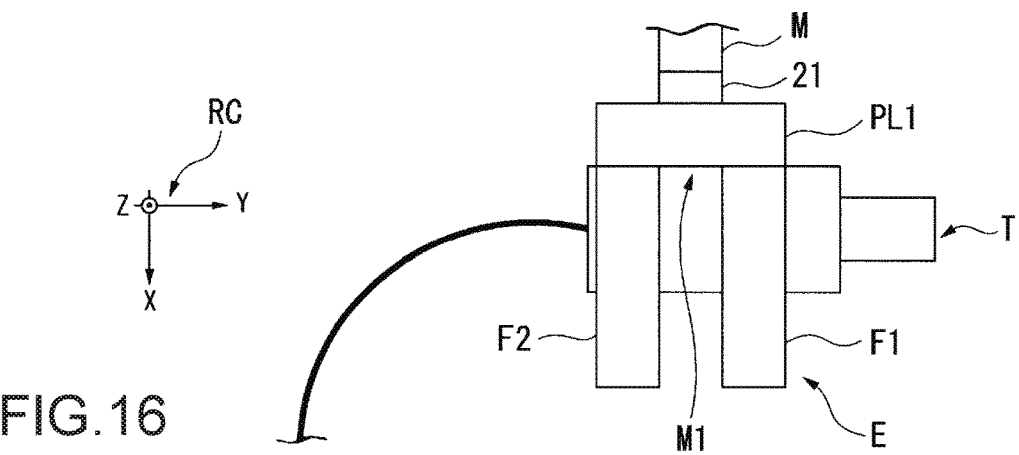
FIG. 16 is a top view of an example in a case where the end effector and the connector illustrated in FIG. 15 are viewed from a positive direction in a Z axis direction toward a negative direction in a robot coordinate system.

FIG. 16 is a top view of an example in a case where the end effector E and the connector PL1 illustrated in FIG. 15 are viewed from a positive direction in a Z axis direction toward a negative direction in a robot coordinate system RC. As illustrated in FIG. 16, the end effector E brings the surface M1 which is a surface on which each of the fingers F1 to F4 of the surface of the end effector E is provided into contact with the surface on the negative direction side of the X axis in the robot coordinate system RC among the surfaces of the connector PL1. Therefore, the end effector E grips the connector PL1 in a state where the connector PL1 is regulated in a direction orthogonal to the gravity direction.

In this manner, the robot 20 can suppress the shifting in the direction orthogonal to the gravity direction of the relative positional relationship between the end effector E which is the portion holding the connector PL1 among the portions of the robot 20 and the connector PL1 and can suppress the shifting of the positional relationship in the gravity direction.

Figure 17:
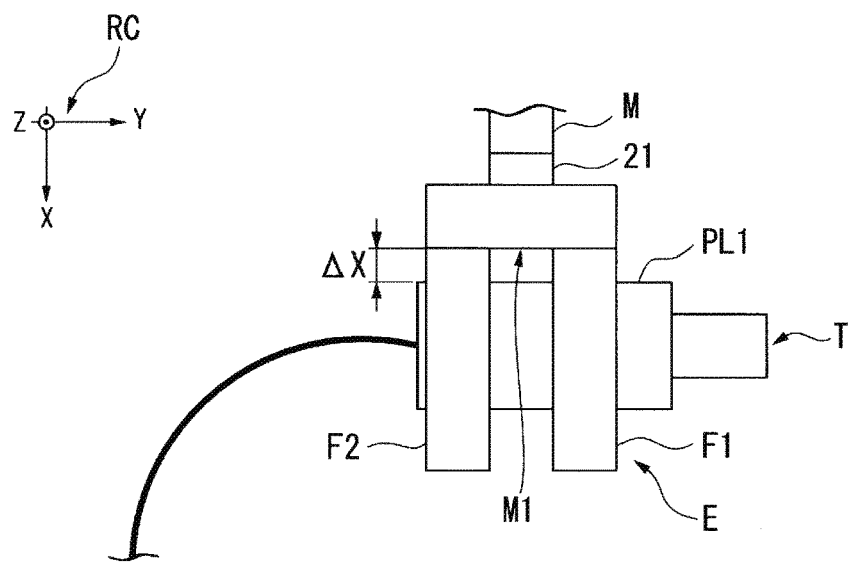
FIG. 17 is a top view of another example in a case where the end effector and the connector illustrated in FIG. 15 are viewed from a positive direction in a Z axis direction toward a negative direction in a robot coordinate system.

When the connector PL1 is gripped, the end effector E may be configured so that the surface M1 is not brought into contact with the surface on the negative direction side of the X axis in the robot coordinate system RC among the surfaces of the connector PL1 as illustrated in FIG. 17.

FIG. 17 is a top view of another example in a case where the end effector E and the connector PL1 illustrated in FIG. 15 are viewed from a positive direction in a Z axis direction toward a negative direction in a robot coordinate system RC. In the example illustrated in FIG. 17, a gap of a distance ΔX is provided between the surface M1 and the surface on the negative direction side of the X axis in the robot coordinate system RC among the surfaces of the connector PL1. In FIG. 17, although a case where the surface M1 and the surface on the negative direction side of the X axis in the robot coordinate system RC among the surfaces of the connector PL1 are parallel is illustrated, but these surfaces may not be parallel. Examples in which these surfaces are not parallel but orthogonal to each other are the examples illustrated in FIGS. 2 and 3. As these surfaces are closer from the state (parallel state) illustrated in FIG. 17 to the state (orthogonal state) illustrated in FIGS. 2 and 3, even in a case where another object is positioned in a vicinity of an entrance of the insertion portion PL21 of the connector PL2 and the vicinity of the entrance is further narrow, the robot 20 can insert the connector PL1 into the insertion portion PL21 without bringing the end effector E into contact with the object.

The method of gripping the connector PL1 by the end effector E of the robot 20 may be a method other than the method described above as long as the connector PL1 is held from both of the gravity direction and the direction opposite to the gravity direction. For example, the method of gripping the connector PL1 by the end effector E of the robot 20 may be a method of gripping the connector PL1 from the positive direction toward the negative direction of the Z axis in the robot coordinate system RC, by the end effector that can surround and hold the periphery of the connector PL1. In addition, in a case where the connector PL1 is lifted by an end effector that adsorbs the connector PL1 by air or magnetic force, the method of gripping the connector PL1 by the end effector E of the robot 20 may be a method of regulating the movement of the connector PL1 in the gravity direction depending on the portion capable of supporting the connector PL1 from the negative direction toward the positive direction of the Z axis in the robot coordinate system RC. The portion may be a portion provided in the end effector or may be a portion different from the end effector.

As described above, the robot 20 (or robot system 1) according to the first embodiment and the second embodiment holds the first object (connector PL1 in this example) from the gravity direction and the direction opposite to the gravity direction, and inserts the first object into the insertion portion (insertion portion PL21 in this example) provided in the second object (connector PL2 in this example). In this manner, the robot 20 can suppress the shifting of the relative positional relation between the portion holding the first object among the portions of the robot 20 (end effector E in this example) and the first object in the gravity direction.

In addition, the robot 20 grips the first object in a state where the first object is regulated in the direction orthogonal to the gravity direction. In this manner, the robot can suppress the shifting of the relative positional relationship between the portion holding the first object among the portions of the robot 20 and the first object in the direction orthogonal to the gravity direction, and can suppress the shifting of the positional relationship in the gravity direction.

In addition, in the case where the robot 20 causes the arm (arm A in this example) to move at least one of the first object and the second object in the direction (first direction A1) where the first object and the second object approach each other, and determines that the first object comes into contact with the position different from the insertion portion based on the output (force detection information in this example) of the force detector (force detection unit 21 in this example), the robot 20 separates the first object and the second object from each other. In this manner, the robot 20 can prevent the first object and the second object from being deformed in a case where the first object comes into contact with the position different from the insertion portion provided in the second object.

In addition, in a case where the robot 20 determines that the first object comes into contact with the position different from the insertion portion provided in the second object, the robot 20 moves at least one of the first object and the second object in the direction orthogonal to the gravity direction and the direction other than the direction opposite to the direction where the first object and the second object approach each other (direction A2 in this example), among the directions where the first object and the second object are separated from each, and separates the first object and the second object from each other. In this manner, the robot 20 can start moving at least one of the first object and the second object in the direction from the position (current standby position in this example) that is the previous position and is different from the position (previous standby position in this example) at which the first object and the second object start moving in the approaching direction.

In addition, the robot 20 performs an operation of separating the first object and the second object from each other by position control. In this manner, the robot 20 can shorten the time for inserting the first object into the insertion portion of the second object.

In addition, the robot 20 holds the electronic component (connector PL1 in this example) from the gravity direction and the direction opposite to the gravity direction, and inserts the electronic component into the insertion portion provided in the second object. In this manner, the robot 20 can shorten the time for inserting the electronic component into the insertion portion of the second object.

Hereinbefore, although the embodiment of the invention is described in detail with reference to the drawings, the specific configuration is not limited to this embodiment, and modifications, substitutions, deletions and the like may be made without departing from the gist of the invention.

In addition, a program for realizing the function of a certain component in the devices described above (for example, robot control device 30) may be recorded on a computer readable recording medium, and the program may be read into the computer system so as to be executed. The "computer system" referred to in here includes hardware such as an operating system (OS) and peripheral devices. In addition, the "computer-readable recording medium" refers to a portable medium such as a flexible disk, a magneto-optical disk, a ROM, a compact disk (CD)-ROM, and a storage device such as a hard disk incorporated in a computer system. Furthermore, the "computer readable recording medium" includes a medium holding a program for a certain period of time, such as a volatile memory (RAM) inside the computer system serving as a server or a client in a case where a program is transmitted via a network such as the Internet or a communication line such as a telephone line.

In addition, the above program may be transmitted from the computer system in which the program is stored in a storage device or the like to another computer system via a transmission medium or by a transmission wave in a transmission medium. Here, the "transmission medium" for transmitting the program refers to a medium having a function of transmitting information such as the network (communication network) such as the Internet or the communication line such as the telephone line. In addition, the above program may be for realizing a part of the functions described above. Furthermore, the above program may be a program which can realize the functions described above by a combination with a program previously recorded in the computer system, a so-called difference file (difference program).

The entire disclosure of Japanese Patent Application No. 2016-090391, filed Apr. 28, 2016 is expressly incorporated by reference herein.

What is claimed is:

1. A robot comprising:
an arm;
an end effector disposed on a distal end of the arm;
a force detector disposed between the arm and the end effector and being configured to detect a force; and
a controller configured to control the arm and the end effector based on an output from the force detector,
wherein the end effector includes a first finger and a second finger, and the controller independently controls the first finger to move in a gravity direction and the second finger to move in a direction opposite the gravity direction,
wherein a first object is held from both of the gravity direction and the direction opposite to the gravity direction by the first finger and the second finger, and the first object is inserted into an insertion portion provided in a second object,
based on an output of the force detector, the controller determines when a positional relationship between the first object and the end effector does not shift in the gravity direction and controls the first finger to remain still and the second finger to move in the direction opposite the gravity direction.

2. The robot according to claim 1, wherein the first object is gripped in a state where the first object is regulated in a direction orthogonal to the gravity direction.

3. The robot according to claim 1, wherein at least one of the first object and the second object is moved by the arm in a direction where the first object and the second object approach each other, and thus in a case where it is determined that the first object comes into contact with a position different from the insertion portion based on an output of the force detector, the first object and the second object are separated from each other.

4. The robot according to claim 3, wherein in a case where it is determined that the first object comes into contact with the position, at least one of the first object and the second object is moved in a direction that is other than the direction opposite to the approaching direction, and is a direction orthogonal to the gravity direction among the directions where the first object and the second object separate from each other, and thus the first object and the second object are separated from each other.

5. The robot according to claim 4, wherein an operation that separates the first object and the second object from each other is performed by position control.

6. The robot according to claim 1, wherein the first object is an electronic component.

7. The robot according to claim 1, wherein the first object is held from both of the gravity direction and a direction opposite and orthogonal to the gravity direction.

* * * * *